United States Patent
Perper et al.

(10) Patent No.: US 9,942,187 B2
(45) Date of Patent: Apr. 10, 2018

(54) ALERT FOR MESSAGES "STUCK" IN A MESSAGE QUEUE WITHIN A MESSAGING APPLICATION

(71) Applicants: Harry Leonard Perper, N. Potomac, MD (US); James Randall Beckers, Rockville, MD (US); Mark Meister, Potomac, MD (US)

(72) Inventors: Harry Leonard Perper, N. Potomac, MD (US); James Randall Beckers, Rockville, MD (US); Mark Meister, Potomac, MD (US)

(*) Notice: Subject to any disclaimer, the term of this patent is extended or adjusted under 35 U.S.C. 154(b) by 37 days.

(21) Appl. No.: 14/202,726

(22) Filed: Mar. 10, 2014

(65) Prior Publication Data

US 2015/0256500 A1    Sep. 10, 2015

(51) Int. Cl.
| | |
|---|---|
| G06F 15/16 | (2006.01) |
| H04L 12/58 | (2006.01) |
| G06Q 10/10 | (2012.01) |
| G06F 12/00 | (2006.01) |

(52) U.S. Cl.
CPC .......... *H04L 51/30* (2013.01); *G06Q 10/107* (2013.01)

(58) Field of Classification Search
CPC ...... G06Q 10/107; G06Q 10/10; G06Q 30/02; G06Q 10/0637; G06Q 10/103; G06Q 10/109; G06Q 30/0251; G06Q 30/0281; G06Q 30/06; H04L 51/22; H04L 51/30; H04L 51/12; H04L 63/0272; H04L 63/08; H04L 63/126; H04L 67/02; H04L 69/329
USPC ................. 709/203, 223–229, 250
See application file for complete search history.

(56) References Cited

U.S. PATENT DOCUMENTS

| | | | | |
|---|---|---|---|---|
| 5,592,624 | A  * | 1/1997 | Takahashi | G06F 15/17 709/212 |
| 6,460,074 | B1 | 10/2002 | Fishkin | |
| 8,196,151 | B1 * | 6/2012 | Leonard | G06F 3/00 719/314 |
| 2006/0088915 | A1 | 4/2006 | Ohtaki et al. | |
| 2007/0067436 | A1 | 3/2007 | Vaughn | |
| 2009/0099424 | A1 | 4/2009 | O'Brien et al. | |
| 2010/0094626 | A1 | 4/2010 | Li et al. | |
| 2012/0297316 | A1 * | 11/2012 | Ercegovic | G06Q 10/107 715/752 |
| 2013/0054706 | A1 * | 2/2013 | Graham | H04M 19/04 709/206 |

* cited by examiner

*Primary Examiner* — Zarni Maung
(74) *Attorney, Agent, or Firm* — Staas & Halsey LLP (57) ABSTRACT

A system and method to provide a message handling system (eg email) user an alert when one or more messages remain in the outbox of the message handling system after the message transmission process has completed more than a user definable number of times or has been in the outbox longer than a user definable amount of time. Once alerted the user will have the option to take one or more actions (independent of the system and method) to remove the message or messages from the outbox.

15 Claims, 11 Drawing Sheets

Figure 1

High Level Operating Flowchart of the Outbox Message Process utilizing the Message Identification and MTP Time List (figure 5)

Figure 2

High Level Operating Flowchart of the Outbox Monitoring Process utilizing the Outbox Message Process, Message Identification and MTP Completion Indicator List (figure 4)

| Message Identification and MTP Completion Indicator (OMP MTP CI) List | |
|---|---|
| Message ID | MTP Completion Indicator (CI) |
| 1234abcd | 0 |
| 1235djine | 1 |
| 3487cndi | 2 |
| Feirn2172 | 0 |

404 — Message ID
403 — MTP Completion Indicator (CI)
402

| Message Identification and MTP Time List ||||
|---|---|---|---|
| Message ID | T1 | MTP T2 | |
| 1234abcd | 263 | 0 | |
| 1235djine | 283 | 300 | |
| 3487cndi | 299 | 300 | |
| Feirn2172 | 301 | 0 | |

High Level Operating Flowchart of the Outbox Monitoring Process utilizing the
Outbox Message and MTP Completion Indicator List (Figure 8)

709

Z equals a default number or user defined maximum number of times the MTP operation occurs prior to being alerted of a "stuck" message.

| Outbox Message and MTP Completion Indicator (OMP MTP CI) List | |
|---|---|
| Message (804) | MTP Completion Indicator (803) |
| Message 1 | 0 ← 802 |
| Message 3 | 1 |
| Message 6 | 2 |
| Message 2 | 0 |

Figure 9

High Level Operating Flowchart of a Message Queue Monitoring Process
utilizing the Message Identification and Queue Time List (figure 10)

909

X equals a default time or user defined time a message can remain in the message queue prior to alerting the user that a message is stuck in the message queue.

910

A equals a default or user defined time interval used to determine when the Message Queue Monitor Process performs step 904, review the content of the Message Identification and Queue Time List.

| Message Identification and Queue Time List | |
|---|---|
| Message ID (1004) | Queue Entry (T1) (1003) |
| 1234abcd | 263 |
| 1235djine | 283 |
| 3487cndi | 299 |
| Feirn2172 | 301 |

ALERT FOR MESSAGES "STUCK" IN A MESSAGE QUEUE WITHIN A MESSAGING APPLICATION

CROSS-REFERENCE TO RELATED APPLICATION

N/A.

BACKGROUND

1. Field

The present invention is directed to a method and system of processing data of a message or messages prior to transmission of the message ascertain the existence of and release a message stuck in an message queue or short message service (SMS) message queue or email box such as an outbox or draft box.

2. Description of the Related Art

It is not uncommon for an electronic message (e.g., email) to get "stuck" in the outbox, draft box or outgoing message queue of an electronic message handling system (for example, email application). A message or messages are considered "stuck" in the outbox or any other message queue when the message or messages remain after a transfer or transmission function fails to remove the message or messages from the queue. When messages are "stuck" in, for example, the outbox the user may not notice and expect that those messages are sent as usual in a timely manner. Those "stuck" messages typically are not sent until the user takes action to either re-send the message or remove the message from the outbox using the functions provided by the message handling system.

An email message draft may be maintained in a queue of messages called "Drafts" typically until the message is completed and sent. A user can start a draft of a message on one morning, store it as a draft, get interrupted and may not return to the message until much later. If the email application is later shutdown, the message will remain in the "Drafts" queue. The next time the application is opened, the draft message is shown as residing in the "Drafts" queue.

Email messages that are being drafted may also sit on a desktop email application interface (GUI) in or on a task bar until the email application is closed, referred to as an in process message queue. Typically if the email application is kept on, open and not shutdown, as long as the email application is open, the message will remain on the task bar, or in process message queue until the user initiates the send command. If the application is shutdown, the user may be alerted and asked if the message residing on the task bar is to be saved (or sent). If saved, it will be saved in the "Drafts" queue. If not saved or sent, it will be deleted. If the email application is constantly on, such as may occur in a cell telephone or smartphone, the draft may sit unsent indefinitely. If the email application is closed and the message is in the "Drafts" queue, it may also remain unsent indefinitely.

It may be that the user would want to make sure that draft or in process messages do not remain unsent and may want to be reminded when they remain unsent. What is needed is a system that will notify a user when a draft or in process message erroneously remains unsent.

The standard operation of a message handling system transfers a message or multiple messages to the outbox of the message handling system after the user has started the send operation. The outbox is a queue for messages ready to be transferred from the message handling system to the message transmission system for delivery to another message handling system or another transmission system. A draft box is a queue to store incomplete messages prior to the user starting the send operation. An in process message queue is a queue for messages that the user is in the process of drafting, prior to the user initiating the send command or saving in the draft queue.

A message transmission process performs the transfer of messages from a message queue to another message queue or to the message transmission system. In the case of an outbox, if the message transmission process (MTP) transfers all of the outbox queue messages from the outbox to the message transmission system the outbox queue is emptied. However, from time to time the outbox queue is not emptied properly by the MTP and one or more messages remain in the outbox when the MTP completes or terminates improperly. When those messages remain in the outbox they can prevent or block other messages from being transferred or may individually remain in the outbox until the system or the user removes them using a process other than the MTP. Unfortunately current message handling systems do not monitor the outbox or other queue for "stuck" messages for the purpose of notifying the user when one or more messages are left, unsent, in the outbox queue.

Monitor processes and alert systems are needed to notify the user of the message handling system that one or more messages have failed to be transferred from the outbox, draft or in process queues by a message transmission process (MTP). The message handling system may be a local computer or a remote system/server. The outbox or other message queue may reside on a local computer or a remote system/server. The message transmission process may occur on a local computer system or a remote system/server.

SUMMARY

It is an aspect of the embodiments discussed herein to provide a system and method enabled to determine whether a message remains in a message queue, for example an outbox of a message handling system longer than expected. The message queue may be an outbox, draft box or other message handling queue within a message handling system. Once the system determines that one or more messages remain in the outbox after a pre-determined amount of time or other metric the system will notify the user that one or more messages remain in the outbox. The user will determine which message handling system functions to initiate, if any, to remove the messages from the outbox.

These together with other aspects and advantages which will be subsequently apparent, reside in the details of construction and operation as more fully hereinafter described and claimed, reference being made to the accompanying drawings forming a part hereof, wherein like numerals refer to like parts throughout.

BRIEF DESCRIPTION OF THE DRAWINGS

These and/or other aspects and advantages will become apparent and more readily appreciated from the following description of the embodiments, taken in conjunction with the accompanying drawings of which.

DETAILED DESCRIPTION OF THE EMBODIMENTS

Reference will now be made in detail to the present embodiments discussed herein, examples of which are illustrated in the accompanying drawings, wherein like reference numerals refer to the like elements throughout. The embodiments are described below to explain the disclosed system and method by referring to the figures. It will nevertheless be understood that no limitation of the scope is thereby intended, such alterations and further modifications in the illustrated device, and such further applications of the principles as illustrated therein being contemplated as would normally occur to one skilled in the art to which the embodiments relate.

To overcome drawbacks of the above discussed typical technologies and similar others, the disclosed system and method provide a tool for determining if a one or more messages are stuck in the outbox (or other) queue of a message handling system after one or more message transfer processes (or other similar processes that have the same effect of removing messages from a queue where messages are held while awaiting transmission or transfer to another queue within a message handling system) have occurred. Transferring, transmitting or sending of a message as referred herein includes transmission of a message of any type from one message handling system or computer to another or transferring a message within a computer (i.e., from one application to another, or from one queue to another) or virtual computer systems.

An application program that implements an outbox monitor process and alert system is a method that may be implemented to help users become aware of one or more messages that remain unsent in the outbox (or any other queue within a message handling system). The outbox monitor process (OMP), as described in more detail below, may keep a list of the messages in the outbox for the purpose of determining if messages are left in the outbox after the MTP completes or terminates unexpectedly without removing all of the messages from the outbox. The OMP may add messages to the list as they are placed in the outbox and messages may be removed from the list when they are transferred (removed) from the outbox by the MTP. The list of messages may be used to identify messages that remain in the outbox after the MTP completes or terminates unexpectedly without removing all of the messages from the outbox. Messages that remain in the outbox after the MTP completes or terminates unexpectedly may be individually identified using the list of messages by the monitor system. The OMP may check the outbox queue to determine if any message remains after the MTP completed. For any message that remains in the outbox after a user defined number of MTP operations the user may receive an optional visual or audible or visual and audible alert to indicate that messages remain ("stuck") in the outbox. The visual indicator may include a list of the messages that remain in the outbox. Once notified, the user could determine the action necessary for each message remaining in the outbox.

An alternative method of achieving the purpose of determining that a message is "stuck" in the outbox may be to keep a list of the messages indicators (such as an identification code or ID) for the purpose of determining if messages are left in the outbox after the MTP completes or terminates unexpectedly without removing all of the messages from the outbox. The OMP may add message IDs to the list as they are placed in the outbox and message IDs may be removed from the list when they are transferred (removed) from the outbox by the MTP. The ID may be a code or number or be based on time stamps. Messages that remain in the outbox after the MTP completes or terminates unexpectedly may be individually identified using the list of message IDs by the monitor system. The OMP may check the outbox queue to determine if any message remains after the MTP completed. For any message that remains in the outbox after a user defined number of MTP operations the user may receive an optional visual or audible or visual and audible alert to indicate that messages remain ("stuck") in the outbox. The visual indicator may include a list of the messages that remain in the outbox. Once notified, the user could determine the action necessary for each message remaining in the outbox.

An alternative method of achieving the purpose of determining that a message is "stuck" in the outbox may be to utilize the message list to track the time that a message is held in the outbox. In this method, as described in more detail below, in addition to each message, or message ID, the time the message is added to the outbox queue may be recorded for each message ID in the list of message IDs. The outbox monitor may also monitor the message transmission process (MTP) for activity. The monitor may record the time each MTP completes processing the outbox. The monitor may remove messages from the list of messages or message IDs when the associated messages were removed from the outbox. Each time the message transmission process (MTP) completes processing the outbox, the monitor may also compare the time of the MTP completion to the time each of the messages in the list of messages or message IDs were added to the list. If any message remains in the outbox after a user defined time limit the user may be notified that one or more messages are "stuck" in the outbox.

An alternative method of achieving the purpose of determining that a message is "stuck" in a message queue may be to utilize the message list to track the time that a message is held in the message queue. In this method, as described in more detail below, in addition to each message, or message ID, the time the message is added to the message queue may be recorded for each message or message ID in the list of messages or message IDs. The message queue monitor may also monitor the amount of time that each message or message ID is present in the message or message ID list. The monitor may check the time each message or message ID has been in the message or message ID list. The monitor would check the message or message ID list based on a pre-defined time interval defined by a default or user defined time interval value. After checking the message or message ID list the monitor removes any messages or message IDs from the list if the corresponding message or messages are no longer in the message queue. After checking the list the monitor may also notify the user that a message or message ID has been in the message queue longer than a default or user defined time value.

Figure 1:
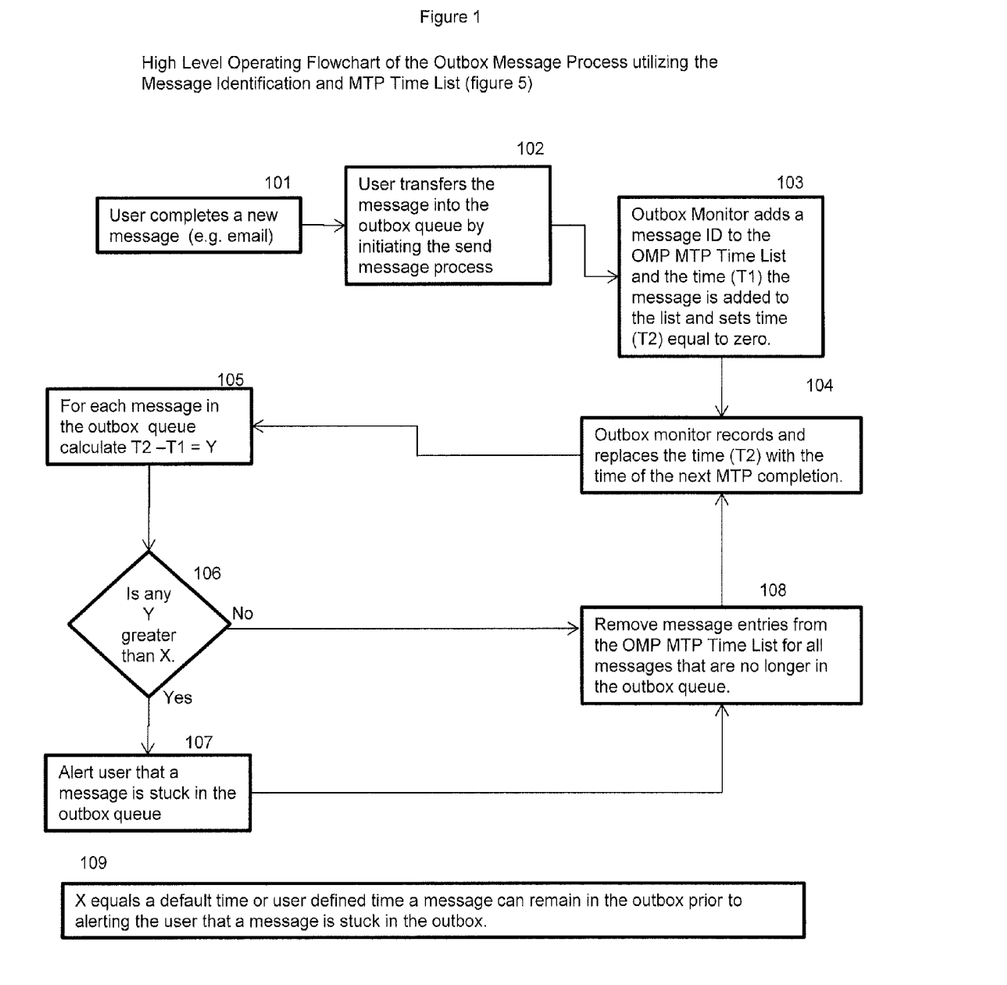
FIG. 1 illustrates a High Level Operating Flowchart of the Outbox Monitoring Process utilizing the Outbox Message Process Message Identification and MTP Time List (FIG. 5)
Figure 3:
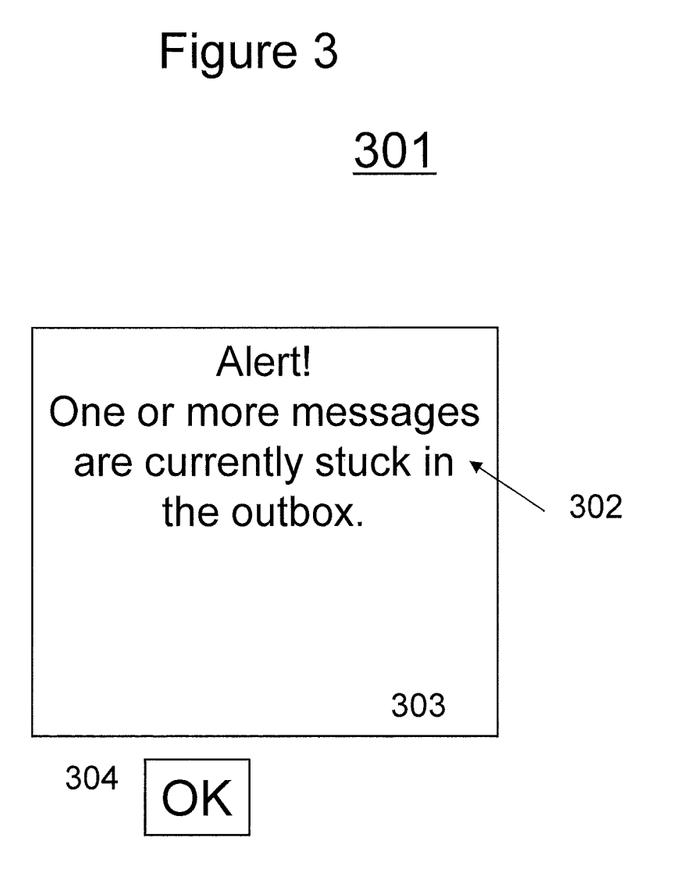
FIG. 3 illustrates an alert provided to an email sender.
Figure 5:
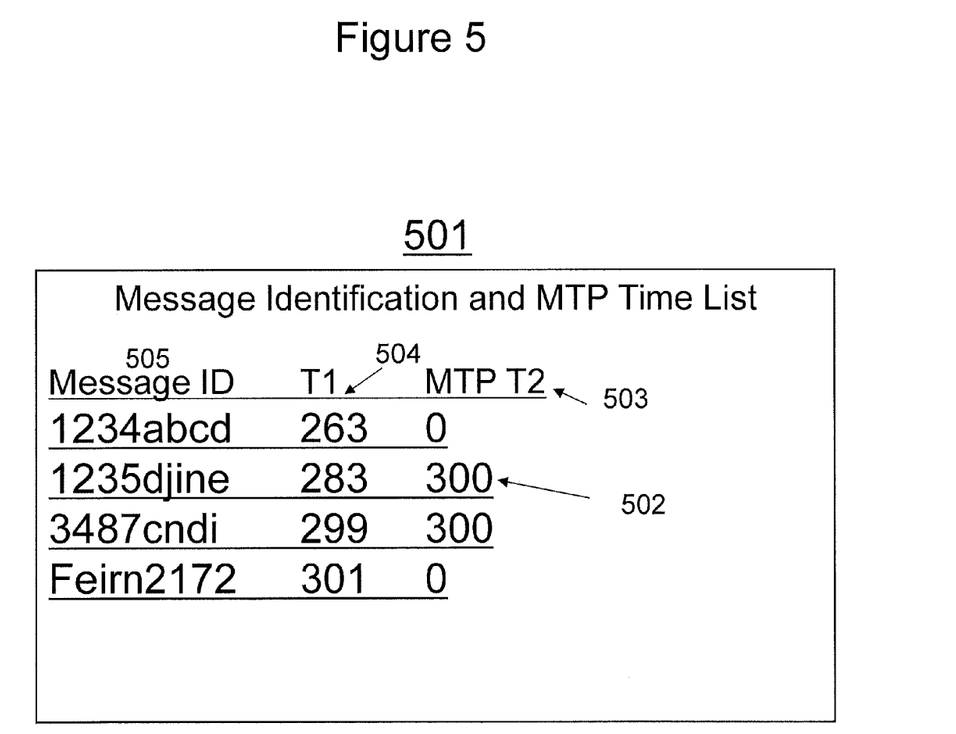
FIG. 5 illustrates a Message Identification and MTP Time List

According to an embodiment, FIG. 1 shows a flowchart describing a process to monitor an outbox queue. As shown in FIG. 1 a message handling system user creates 101 a message, The message is then transferred 102 to the outbox queue by the send message process initiated by the user. Once a message is placed in the outbox queue an outbox monitoring process (OMP) adds 103 505 a message ID, a time the message was added to the outbox queue and sets an MTP time indicator to zero in the OMP MTP Time List (see FIG. 5 item 501). An example entry 502 is included in FIG. 5. The process also monitors 104 the MTP and records the completion time of every MTP operation. The MTP completion time T2 is recorded for each entry in the OMP MTP Time List 501. After each MTP completion time is recorded 104 the process makes a determination 105 and 106 as to whether the message has been in the OMP MTP Time List 501 longer than a predefined "X" amount of time 109. The determination is executed by subtracting the numerical value of the time (T1) the message is added to the OMP MTP Time List 504 from the time (T2) of the last MTP process completion 503. The value of the difference Y is equal to the time the message has been in the OMP MTP Time List. If any message in the OMP MTP Time list has been in the list longer than the predefined amount of time 109 the process will notify 107 the user that one or more messages are "stuck" in the outbox with (See FIG. 3 items 301 302 and 303) a visual display in the email application graphical user interface (GUI) and/or an audible alert. The visual display consists of a window 303 that includes a message 302 and/or an audible alert. After notifying the user of 301 and 302 a message "stuck" in the outbox, the process will continue to remove 108 any messages from the OMP MTP Time List that are no longer in the outbox. If no message on the OMP MTP Time List has been on the list longer than the pre-defined amount of time 109 the process will continue to remove 108 any messages from the OMP MTP Time List that are no longer in the outbox. After the process removes 108 any messages from outbox, the process continues to monitor 104 the MTP for completion. Thereafter, the user will determine which message handling system functions to initiate, if any, to remove the messages from the outbox. When the user is notified of one or messages stuck in the outbox 301 and 302, the user will be able to dismiss the message by clicking on 304 the OK button via 602, a User Input device. User input devices include a keyboard, mouse, keypad or touchpad.

Figure 2:
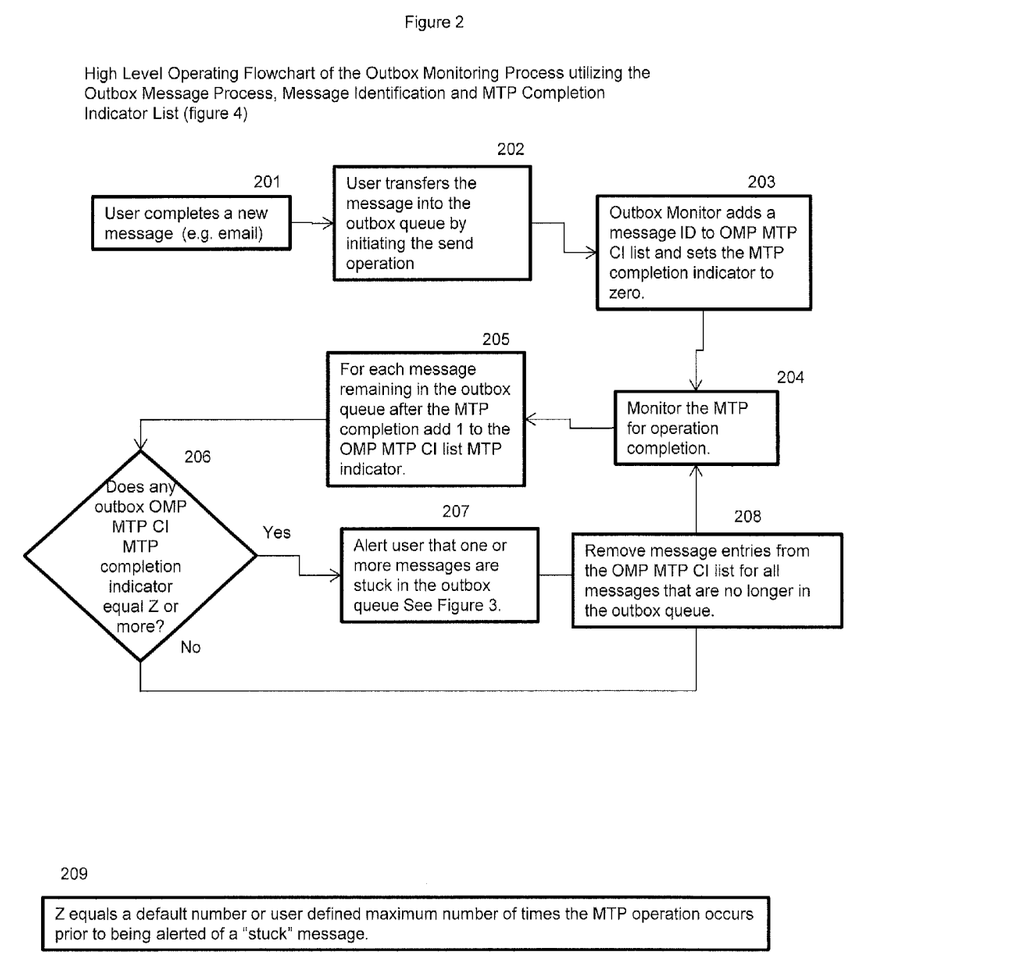
FIG. 2 illustrates a High Level Operating Flowchart of the Outbox Monitoring Process utilizing the Outbox Message Process Message Identification and MTP Completion Indicator List (FIG. 4)
Figure 4:
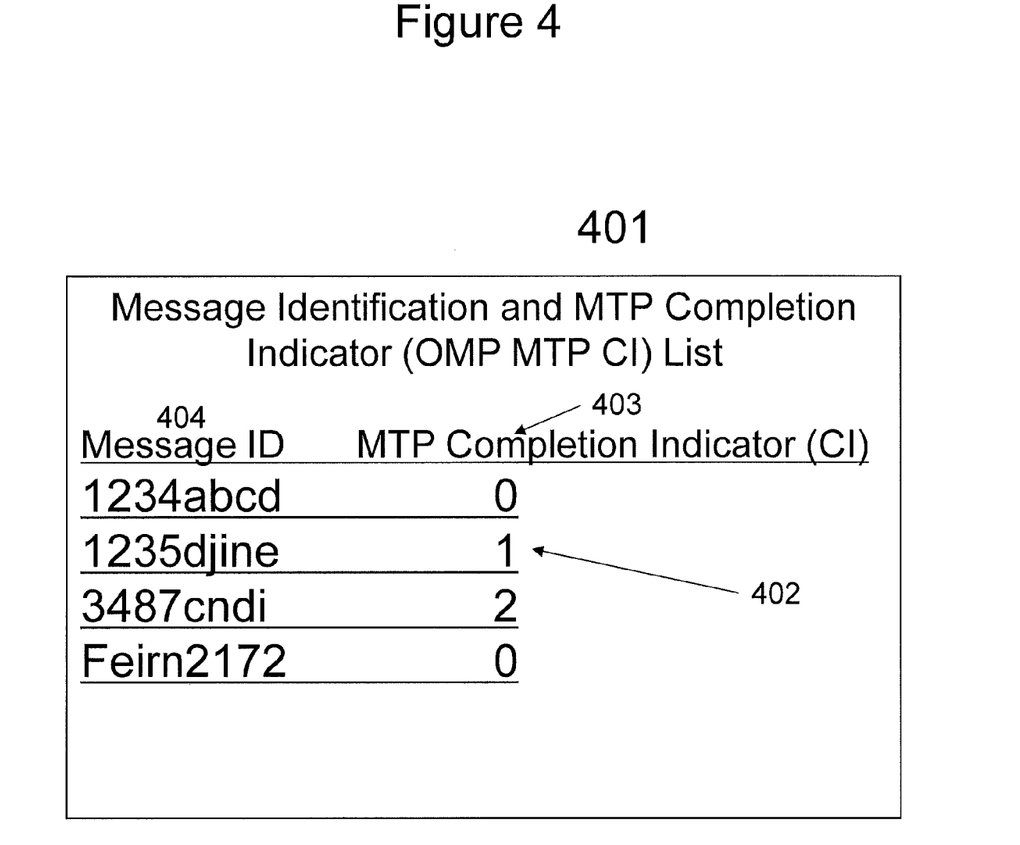
FIG. 4 illustrates a Message Identification and MTP Completion Indicator List

According to another embodiment FIG. 2 shows a flowchart describing a process to monitor an outbox queue. As shown in FIG. 2 a message handling system user creates 201 a message. The message is then transferred 202 to the outbox queue by the send message process initiated by the user. Once a message is placed in the outbox queue an outbox monitoring process (OMP) adds 203 404 a message ID and an MTP Completion Indicator 403 equal to zero 203 into the OMP MTP Completion Indicator (OMP MTP CI) list (see FIG. 4 item 401). An example entry 402 is included in FIG. 4. The process also monitors 204 the MTP for operation completion. After each MTP operation completion, the process adds 205 one ("1") to the MTP Completion Indicator 403 for each message entry in the OMP MTP CI list 401. See FIG. 4 item 401. After each message entry in the OMP MTP CI list 401 is updated the process checks 206 each entry to determine if any entries contain MTP CIs that are greater than a pre-defined maximum 209. If any message in the OMP MTP CI list has an MTP CI greater than the pre-defined maximum 209 the process alerts 207 the user that one or more messages are "stuck" in the outbox via the email application GUI and/or an audible alert. After the user has been notified that one or more messages are "stuck" in the 207 outbox the process removes 208 the message entry or entries from the OMP MTP CI list for the message or messages that are no longer in the outbox. If no message on the OMP MTP CI list has an MTP Completion Indicator greater than the pre-defined maximum 209 the process will remove 208 the message entry or entries from the OMP MTP CI list for the message or messages that are no longer in the outbox. After the process removes 208 any messages from the outbox, the process continues to monitor 204 the MTP for operation completion. The user will then determine which message handling system functions to initiate, if any, to remove the messages from the outbox.

Figure 7:
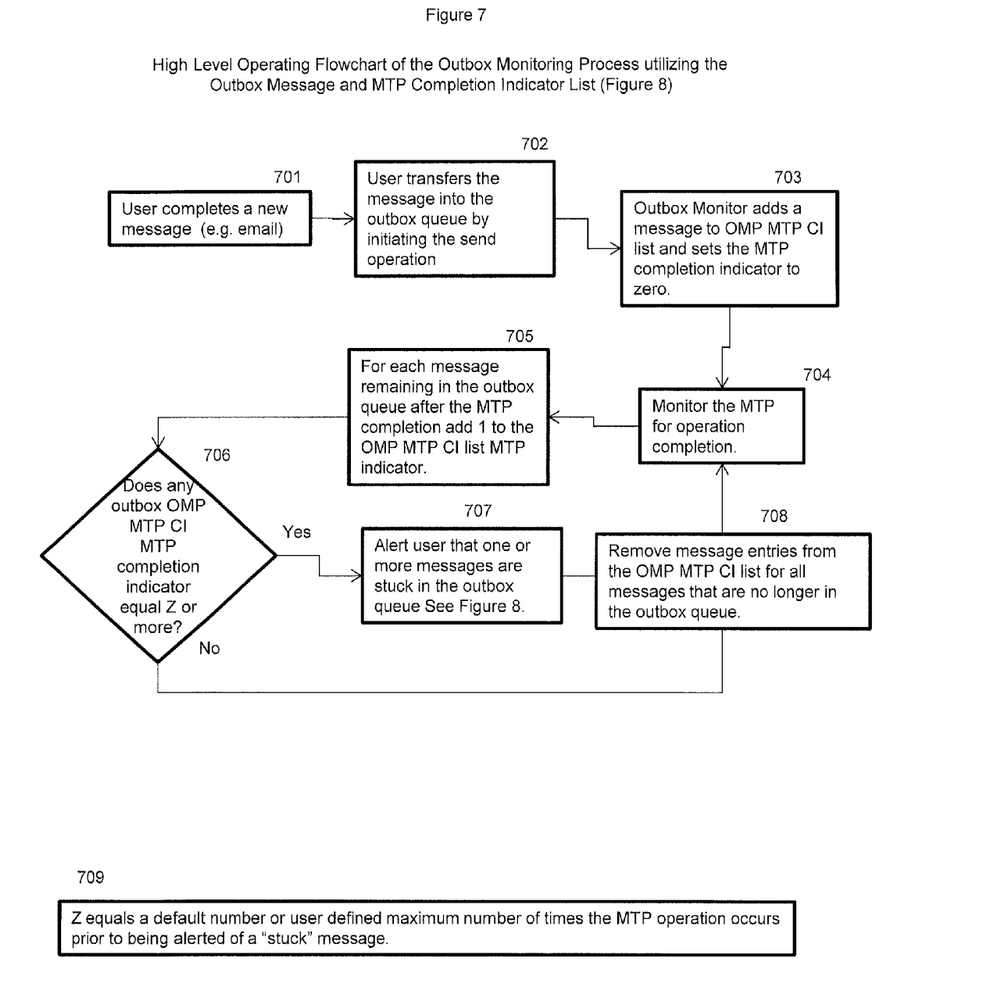
FIG. 7 illustrates a High Level Operating Flowchart of the Outbox Monitoring Process utilizing the Outbox Message and MTP Completion Message List (FIG. 8)
Figure 8:
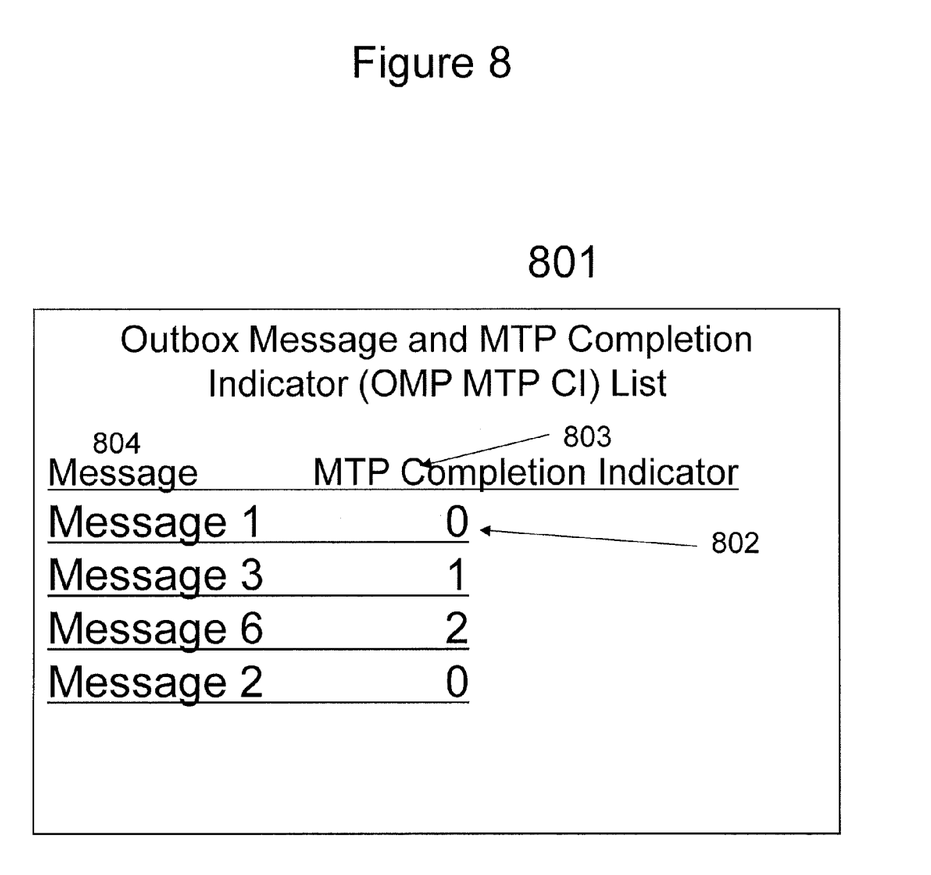
FIG. 8 illustrates an Outbox Message and MTP Completion Message List

According to another embodiment FIG. 7 shows a flowchart describing a process to monitor an outbox queue. As shown in FIG. 7 a message handling system user creates 701 a message. The message is then transferred 702 to the outbox queue by the send message process initiated by the user. Once a message is placed in the outbox queue an outbox monitoring process (OMP) adds 703 804 the message and an MTP Completion Indicator 803 equal to zero 703 into the OMP MTP Completion Indicator (OMP MTP CI) list (see FIG. 8 item 801). An example entry 802 is included in FIG. 8. The process also monitors 704 the MTP for operation completion. After each MTP operation completion, the process adds 705 one ("1") to the MTP Completion Indicator 803 for each message entry in the OMP MTP CI list 801. See FIG. 8 item 801. After each message entry in the OMP MTP CI list 801 is updated the process checks 706 each entry to determine if any entries contain MTP CIs that are greater than a pre-defined maximum 709. If any message in the OMP MTP CI list has an MTP CI greater than the pre-defined maximum 709, the process alerts 707 the user that one or more messages are "stuck" in the outbox via the email application GUI and/or an audible alert. After the user has been notified that one or more messages are "stuck" in the 707 outbox the process removes 708 the message entry or entries from the 801 OMP MTP CI list for the message or messages that are no longer in the outbox. If no message on the OMP MTP CI list has an MTP Completion Indicator greater than the pre-defined maximum 709 the process will remove 708 the message entry or entries from the OMP MTP CI list for the message or messages that are no longer in the outbox. After the process removes 708 any messages from the outbox, the process continues to monitor 704 the MTP for operation completion. The user will then determine which message handling system functions to initiate, if any, to remove the messages from the outbox.

Figure 9:
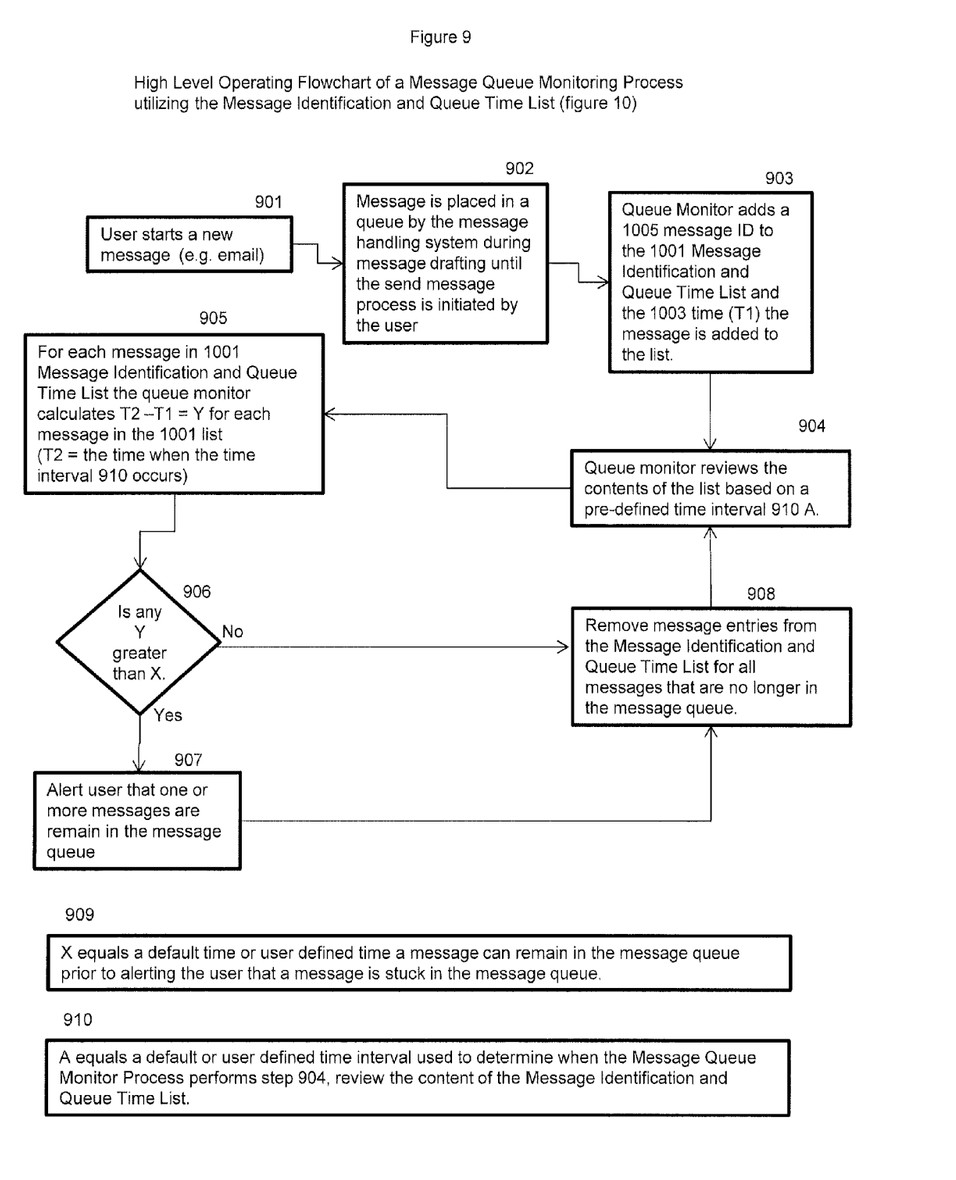
FIG. 9 illustrates a High Level Operating Flowchart of a Message Queue Monitoring Process utilizing the Message Identification and Queue Time List (FIG. 10)
Figure 10:
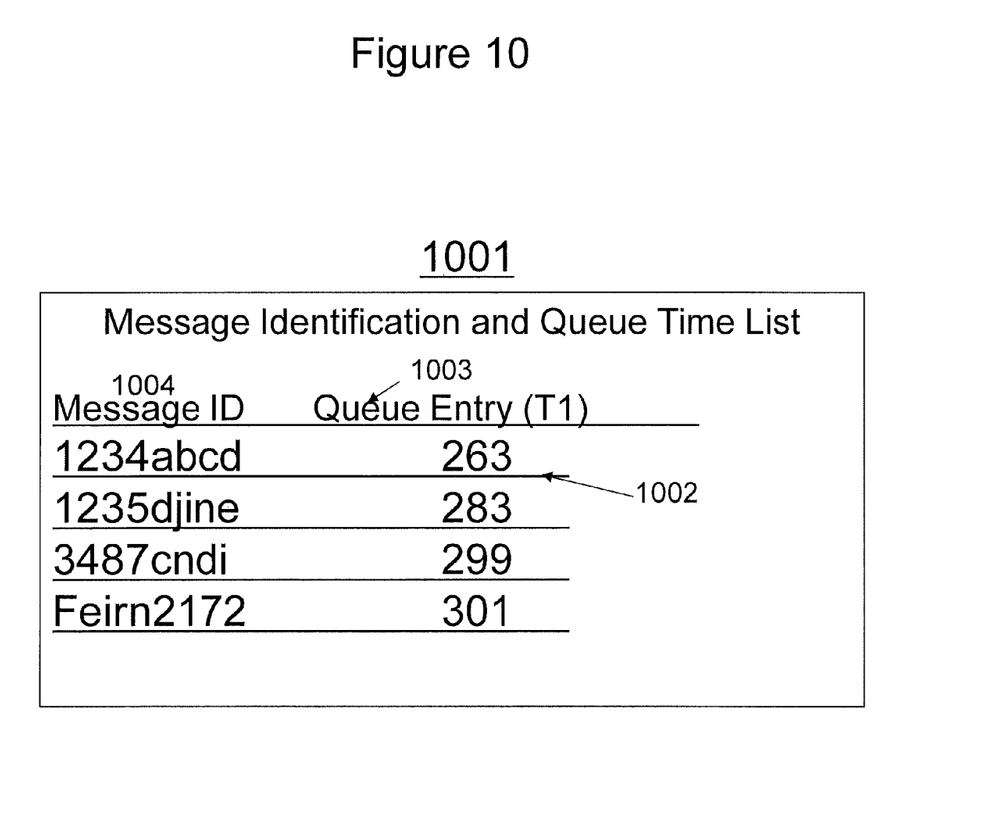
FIG. 10 illustrates an Message Identification and Queue Time List
Figure 11:
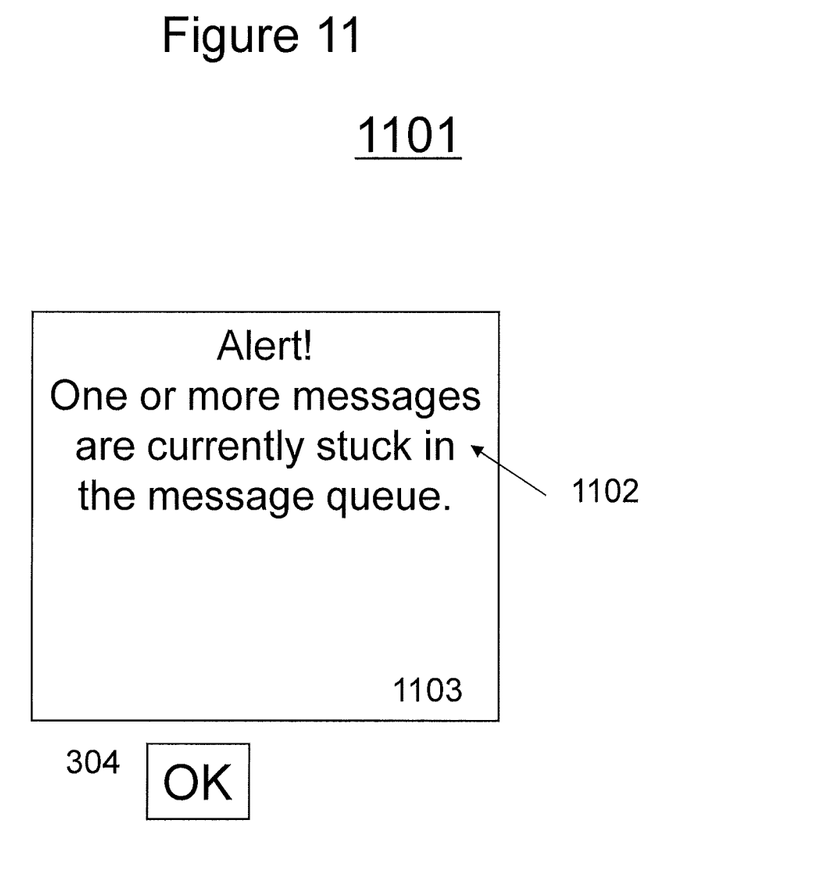
FIG. 11 illustrates an alert provided to a message system user

According to an embodiment, FIG. 9 shows a flowchart describing a process to monitor a message queue. The message queue could be an outbox, draft box or in process message queue. As shown in FIG. 9 a message handling system user starts drafting 901 a message. The partially drafted message is placed in a 902 message queue, by the message handling system during message drafting. The 903 Message Queue Monitor adds a 1004 message ID to the 1001 Message Identification and Queue Time List and the 1003 time (T1) the message is added to the list. An example entry 1002 is included in FIG. 10. The process may also review the contents of the 1001 list based on a pre-defined time 910 interval. The 910 time interval is either a default or user defined time interval. The process may 905 compare the time at each time interval with the 1004 time (T1) each message or message ID was placed in the 1001 list. The process may make a determination 905 and 906 as to whether the message has been in the 1001 List longer than a predefined "X" amount of time 909. The determination is executed by subtracting the numerical value of the time (T1) the message is added to the 1001 list from the time at which the 910 pre-defined time interval expires. The value of the difference Y is equal to the time the message has been in the 1001 message queue list. If any message in the 1001 list has been in the list longer than the predefined amount of time 909 the process will notify 907 the user that one or more messages are "stuck" in the message queue with (See FIG. 11 items 1101, 1102 and 1103) a visual display in the message application user interface (UI) and/or an audible alert. The visual display may consist of a window 1103 that includes a message 1102 and/or an audible alert. After 907 notifying the user of 1101 and 1102 a message "stuck" in the message queue, the process will continue to remove 908 any messages from the 1001 list that are no longer in the message queue. If no message in the 1001 list has been on the list longer than the predefined amount of time 909 the process will continue to review 904 the 1001 list at the pre-defined time intervals. Thereafter, the user will determine which message handling system functions to initiate, if any, to remove the "stuck" messages from the message queue. When the user is notified of one or messages stuck in the message queue 1101 and 1102, the user will be able to dismiss the notification by clicking on 1104 the OK button via 602, a User Input device. User input devices include a keyboard, mouse, keypad or touchpad.

Figure 6:
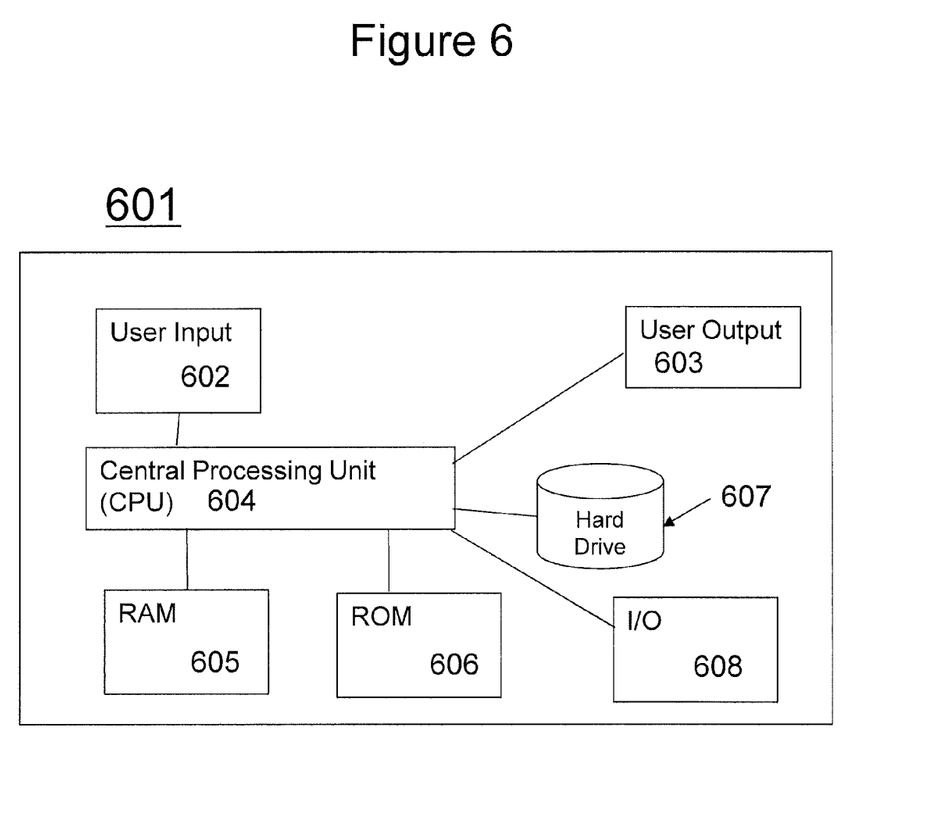
FIG. 6 illustrates a computer or message handling system hardware instantiation

The embodiments can be implemented in 601 computing hardware (computing apparatus) and/or software, such as (in a non-limiting example) any computer that can store, retrieve, process and/or output data and/or communicate with other computers or itself. The 601 computing hardware can comprise 602 User input devices, 603 User Output devices, 604 Central Processing Unit (CPU), 605 Random Access Memory (RAM), 606 Read Only Memory, 607 Hard Drive, 608 computing hardware Input/Output (I/O). The 604 CPU performs processes based on the application program instructions. The results produced can be displayed on 603 User Output display of the computing hardware. An application program implementing the embodiments may be recorded on 607 Hard Drive computer-readable media comprising computer-readable recording media. The program/software implementing the embodiments may also be transmitted via 608 the computing hardware Input/Output over transmission communication media. Examples of the computer-readable recording media include a magnetic recording apparatus, an optical disk, a magneto-optical disk, and/or a semiconductor memory (for example, 605 RAM, 606 ROM, etc.). Examples of the magnetic recording apparatus include a hard disk device (HDD), a flexible disk (FD), and a magnetic tape (MT). Examples of the optical disk include a DVD (Digital Versatile Disc), a DVD-RAM, a CD-ROM (Compact Disc-Read Only Memory), and a CD-R (Recordable)/RW. An example of communication media includes a carrier-wave signal and Internet.

Further, according to an aspect of the embodiments, any combinations of the described features, functions and/or operations can be provided.

The many features and advantages of the embodiments are apparent from the detailed specification and, thus, it is intended by the appended claims to cover all such features and advantages of the embodiments that fall within the true spirit and scope thereof. Further, since numerous modifications and changes will readily occur to those skilled in the art, it is not desired to limit the inventive embodiments to the exact construction and operation illustrated and described, and accordingly all suitable modifications and equivalents may be resorted to, falling within the scope thereof.

Although the embodiment(s) of the present invention(s) has(have) been described in detail, it should be understood that the various changes, substitutions, and alterations could be made hereto without departing from the spirit and scope of the invention, the scope of which is defined in the claims and their equivalents.

What is claimed is:
1. A method, comprising:
determining, by a message handling system including a computer configured to execute a message transmission process, whether an email message by a user is unexpectedly residing in an outbox queue of the message handling system controlled by the computer, the outbox queue being controlled to contain messages waiting to be sent after the user has activated a send function and after the message transmission process unexpectedly terminates;
the determining by the computer includes:
assigning an identifier for the email message,
assigning a residence indicator for the email message, the residence indicator indicating a length of time that the email message has remained in the outbox queue after the user has activated the send function for the email message and the message transmission process unexpectedly terminates,
determining the email message as being unexpectedly residing in the outbox queue when the residence indicator is greater than a threshold length of time,
providing an alert message to the user including the identifier assigned to the email message determined to be unexpectedly residing in the outbox queue by the determining, where the alert message indicates that the email message unexpectedly remains in the outbox queue after the user has activated the send function for the email message and the message transmission process unexpectedly terminates;
displaying, by the computer, the email message identified by the identifier in the alert message to allow a selection of the email message to be retrieved and sent; and
electronically retrieving and sending the email message over a communication network to a recipient when the email message is selected by the user in the selection,
wherein, when the email message has remained in the outbox queue for greater than the threshold length of time, the computer is configured to control the message transmission process to execute the displaying and according to the selection release the email message, from the outbox queue through the electronically retrieving and sending of the email message over the communication network.
2. A method, comprising:
recognizing automatically that a mail transmission process has terminated;
determining, by a message handling system including a computer, whether an email message by a user unexpectedly remains in an outbox queue of messages to be sent after the mail transmission process has terminated;

the determining by the computer includes:
  adjusting a completion indicator that the email message has remained in the outbox queue responsive to the determining,
  determining whether the completion indicator is greater than or equal to a length of time threshold, and
  determining the email message as being unexpectedly remaining in the outbox queue when the completion indicator is determined to be greater than or equal to the length of time threshold,
providing an alert message to the user including an identifier assigned to the email message determined to be unexpectedly remaining in the outbox queue by the determining, where the alert message indicates that the email message erroneously remains in the outbox queue after the mail transmission process has terminated and a send function has been activated for the email message;
displaying, by the computer, the email message identified by the identifier in the alert message to allow a selection of the email message to be retrieved and sent; and
electronically retrieving and sending the email message over a communication network to a recipient when the email message is selected by the user in the selection,
wherein, when the email message has remained in the outbox queue for greater than the length of time threshold, the computer is configured to control the mail transmission process to execute the displaying and according to the selection release the email message, from the outbox queue through the electronically retrieving and sending of the email message over the communication network.

3. A method, comprising:
determining, by a message handling system including a computer, whether an email message by a user unexpectedly remains in an outbox queue of messages to be sent after a message transmission process unexpectedly terminates;
the determining by the computer includes:
  assigning an indicator for the email message, the indicator indicating a length of time that the email message has remained in the outbox queue after the user has activated a send function for the email message and the message transmission process unexpectedly terminates,
  determining the email message as being unexpectedly remaining in the outbox queue when the indicator is greater than a threshold length of time,
alerting the user that the email message erroneously remains in the outbox queue longer than the threshold length of time according to the determining, and displaying, by the computer, the email message to allow a selection of the email message to be retrieved and sent; and
electronically retrieving and sending the email message over a communication network to a recipient when the email message is selected by the user in the selection,
wherein, when the email message has remained in the outbox queue for greater than the threshold length of time, the computer is configured control the message transmission process to execute the displaying and according to the selection release the email message, from the outbox queue through the electronically retrieving and sending of the email message over the communication network.

4. A method as recited in claim 3, wherein the determining comprises:
  providing a message identifier (ID) identifying the email message for an outbox queue monitor process mail transmission process time list when the email message is added to the outbox queue;
  providing an entry time for the email message for the outbox queue monitor process mail transmission process time list when the email message is added to the outbox queue;
  providing a completion time that the mail transmission process completes for the outbox queue monitor process mail transmission process time list;
  determine a time difference between the entry time and the completion time;
  comparing the difference to the threshold length of time; and
  determining that the email message erroneously remains in the outbox queue when the difference is greater than the threshold length of time.

5. A method as recited in claim 4, further comprising deleting the message ID, entry time and completion time when the email message is not in the outbox queue.

6. A method as recited in claim 5, wherein the threshold length of time is set by the user.

7. A method as recited in claim 3, wherein the determining comprises:
  providing a message identifier (ID) for the email message to an outbox queue monitor process mail transmission process completion indicator list;
  monitoring the mail transmission process for completion;
  incrementing a mail transfer process completion indicator for the email message when the mail transmission process completes;
  comparing the mail transfer process completion indicator to a threshold; and
  determining that the email message erroneously remains in the outbox queue when the indicator is greater than or equal to the threshold.

8. A method as recited in claim 7, further comprising deleting the message ID and the mail transfer process completion indicator when the email message is not in the outbox queue.

9. A method as recited in claim 8, wherein the threshold length of time is set by the user.

10. A system, comprising:
a computer of a message handling system performing an email transmission process, the computer determining by the email transmission process whether an email message of a user unexpectedly remains in an outbox queue of messages to be sent after the email transmission process unexpectedly terminates and providing an alert to the user when the email message erroneously remains in the outbox queue beyond a threshold time;
a display displaying the alert and allowing the user to make a selection of the email message to be sent; and
electronically retrieving and sending the email message over a communication network to a recipient when the email message is selected by the user in the selection,
wherein, when the email message has remained in the outbox queue for greater than the threshold time, the computer is configured to control the email transmission process to execute the displaying and according to the selection release the email message, from the outbox queue through the electronically retrieving and sending of the email message over the communication network.

11. A non-transitory computer readable storage storing a program to cause a computer to execute a process, the process comprising:
  determining, by the computer, whether an email message unexpectedly remains in an outbox queue of messages to be sent after a message transmission process unexpectedly terminates;
  the determining by the computer includes:
    assigning an indicator for the email message, the indicator indicating a length of time that the email message has remained in the outbox queue after a user has activated a send function for the email message and the message transmission process unexpectedly terminates,
    determining the email message as being unexpectedly remaining in the outbox queue when the indicator is greater than a threshold time, and
  alerting the user that the email message unexpectedly remains in the outbox queue according to the determining and allowing the user to review the email message on the computer and make a selection to send the email message, and
  electronically retrieving and sending the email message to a recipient when the email message is selected by the user in the selection,
  wherein, when the email message has remained in the outbox queue for greater than the threshold time, the computer is configured to control the message transmission process to execute the displaying and according to the selection release the email message, from the outbox queue through the electronically retrieving and sending of the email message.

12. A method, comprising:
  determining, by a message handling system including a computer performing an email transmission process, whether an electronic message by a user is unexpectedly residing in an outbox queue for messages after the email transmission process unexpectedly terminates, the outbox queue being controlled to contain messages temporarily waiting to be sent over a communications network by a local message server to another message system until sending is possible after the user has activated a send function;
  the determining by the computer includes:
    assigning an identifier for the electronic message,
    assigning a residence indicator for the electronic message, the residence indicator indicating a length of time that the email message has remained in the outbox queue for messages,
    determining the email message as being unexpectedly residing in the outbox queue when the residence indicator is greater than a threshold length of time,
  providing an alert message display to the user including the identifier assigned to the email message determined to be unexpectedly residing in the outbox queue by the determining, where the alert message indicates that the electronic message erroneously remains in the outbox queue for messages after the user has activated the send function for the email message and the message transmission process unexpectedly terminates, the user, using the display, being enabled to review the email message identified by the identifier in the alert message and make a selection that the email message is to be sent by the local message server to another message system over the communications network; and
  electronically retrieving and sending the email message when the email message selected by the user in the selection,
  wherein, when the email message has remained in the outbox queue for greater than the threshold length of time, the computer is configured to control the email transmission process to execute the displaying and according to the selection release the email message, from the outbox queue through the electronically retrieving and sending of the email message over the communication network.

13. A method as recited in claim 12, wherein the electronic message comprises one of an email message, a short message service message and a text message.

14. A method as recited in claim 12, wherein the communications network comprises an Internet.

15. A method as recited in claim 12, wherein the communications network comprises a wireless communication system.

* * * * *